Patented May 16, 1939

2,158,366

UNITED STATES PATENT OFFICE 2,158,366

BRITTLE FUSIBLE RESIN

Norman D. Hanson, Bloomfield, N. J., and Ernest Kritzmacher, Manchester, Conn., assignors to Bakelite Corporation, New York, N. Y., a corporation of Delaware No Drawing. Application March 27, 1936, Serial No. 71,310

6 Claims. (Cl. 260—25)

This invention relates to the production of brittle, fusible, resinous compositions by the reaction of a phenol and a methylene-containing substance in the presence of an alkaline catalyst such as ammonia.

It is possible to produce brittle, fusible resins by reacting phenols and formaldehyde in the presence of relatively large amounts of ammonia, for example, over 10 percent of ammonia based on the weight of the phenol. It is highly desirable to reduce the proportion of ammonia in order to improve the color of the resulting resins and to improve their resistance to light, but it has been found that any reduction of the amount of ammonia below about 10% on the phenol used resulted in the production of sticky non-grindable resins.

It has now been found that by the introduction of rosin into the resin-forming reaction it is possible to produce resinous materials which are brittle and grindable at ordinary temperatures with the use of only about 1% ammonia based on the phenol. In general, about five to thirty-five parts of rosin are used to each one hundred parts of the phenol, and the ammonia may be reduced to between 0.5 and 1.5 parts per one hundred parts of phenol.

The following is an illustrative example of the invention:

100 parts of cresol, 87 parts of 40% formaldehyde, 20 parts of rosin and 2 to 4 parts of 30% ammonium hydroxide are refluxed together for twenty to ninety minutes. The reaction product is then dehydrated and heated to 110° to 150° C. The resulting fusible, potentially reactive resinous product is brittle and grindable when cold.

It is sometimes desirable to admix with the reaction product of the foregoing example an acid catalyzed resinous product which may also contain rosin.

For example, 100 parts of cresol, 87 parts of 40% formaldehyde, 20 parts of rosin and 3 parts of 30% ammonium hydroxide are refluxed for one hour. To this reaction product is added a refluxed mixture of 100 parts of cresol, 80 parts of 40% formaldehyde, and 1 part of oxalic acid. The mixed reaction products are then dehydrated, giving a potentially reactive resinous product which is brittle and grindable when cold.

Other phenols, such as xylenols and phenol, may be used in place of cresol in the above examples. Equivalent forms of ammonia, such as hexamethylene tetramine, may be substituted for aqueous ammonia.

It will be noted that the invention provides a new brittle resinous product containing not more than 1.5 parts of ammonia to each hundred parts of phenol, which is highly desirable for its ease in handling and low sensitivity to light. It is particularly adapted for use in the production of resin-fiber compositions by admixture with fibrous pulps in the paper mill type of processes.

We claim:

1. A method of producing fusible resins which are brittle when cold which consists in reacting together a phenol and a methylene-containing substance in the presence of from 0.5 to 1.5 parts of ammonia and from five to thirty-five parts of rosin to each one hundred parts of the phenol whereby a resinous condensation product is formed which is inherently brittle when cold independently of the presence of other substances.

2. A method of producing fusible resins which are brittle when cold which consists in reacting together a phenol and a methylene-containing substance in the presence of about one part of ammonia and from five to thirty-five parts of rosin to each one hundred parts of the phenol whereby a resinous condensation product is formed which is inherently brittle when cold independently of the presence of other substances.

3. A method of producing fusible resins which are brittle when cold which consists in reacting together a phenol and a methylene-containing substance in the presence of from 0.5 to 1.5 parts of ammonia and about twenty parts of rosin to each one hundred parts of the phenol whereby a resinous condensation product is formed which is inherently brittle when cold independently of the presence of other substances.

4. A fusible, potentially reactive phenol-formaldehyde resin composition obtained by reacting a phenol and a methylene-containing substance in the presence of from 0.5 to 1.5 parts of ammonia and from five to thirty-five parts of rosin to each one hundred parts of reacted phenol said composition being inherently brittle independently of the presence of other substances.

5. A fusible, potentially reactive phenol-formaldehyde resin composition obtained by reacting a phenol and a methylene-containing substance in the presence of about one part of ammonia and from five to thirty-five parts of rosin to each one hundred parts of reacted phenol said composition being inherently brittle independently of the presence of other substances.

6. A fusible, potentially reactive phenol-formaldehyde resin composition obtained by reacting a phenol and a methylene-containing substance in the presence of from 0.5 to 1.5 parts of ammonia and about twenty parts of rosin to each one hundred parts of reacted phenol said composition being inherently brittle independently of the presence of other substances.

NORMAN D. HANSON.
ERNEST KRITZMACHER.